United States Patent
Burdick et al.

(10) Patent No.: US 6,642,628 B2
(45) Date of Patent: Nov. 4, 2003

(54) COMBINED FOUR WAY AND SEVEN WAY CONNECTOR ASSEMBLY FOR USE WITH A VEHICLE AND FOR ACCOMMODATING A TRAILER TOW PACKAGE

(75) Inventors: Robert C. Burdick, Romulus, MI (US); Richard M. Siepierski, Livonia, MI (US); Weiping Zhao, Canton, MI (US)

(73) Assignee: Alcoa Fujikura Limited, Franklin, TN (US)

( * ) Notice: Subject to any disclaimer, the term of this patent is extended or adjusted under 35 U.S.C. 154(b) by 193 days.

(21) Appl. No.: 09/862,213

(22) Filed: May 23, 2001

(65) Prior Publication Data

US 2003/0020331 A1 Jan. 30, 2003

(51) Int. Cl.$^7$ ................................................. B60L 1/00
(52) U.S. Cl. ....................... 307/9.1; 307/10.1; 307/10.8; 439/35
(58) Field of Search ................................ 307/9.1, 10.1, 307/10.8; 439/35

(56) References Cited

U.S. PATENT DOCUMENTS

| | | | |
|---|---|---|---|
| 4,405,190 A | 9/1983 | Schroeder | 339/28 |
| 4,846,697 A | 7/1989 | Rodgers | 439/35 |
| 5,354,204 A | 10/1994 | Hughes | 439/35 |
| 5,443,389 A | 8/1995 | Hughes | 439/35 |
| 5,514,009 A | 5/1996 | Hughes | 439/35 |
| 5,611,695 A | 3/1997 | Bentley | 439/35 |
| 5,765,848 A | 6/1998 | Silvey | 280/422 |
| 5,993,262 A | 11/1999 | Kowdynski et al. | 439/638 |
| 2002/0125771 A1 * | 9/2002 | Kaminski | 307/10.1 |

* cited by examiner

Primary Examiner—Brian Sircus
Assistant Examiner—Robert L DeBeradinis
(74) Attorney, Agent, or Firm—Douglas J. McEvoy; Tracey D. Beiriger

(57) ABSTRACT

A combined four way and seven way connector assembly for communicating a towing vehicle's electrical system with either a four way or seven way input harness associated with a towed vehicle. The towing vehicle includes a wire harness supplying an output of the electrical system. The connector assembly provides a three dimensional housing including a top and a plurality of interconnected sides and which is secured to a suitable rear end location of the towing vehicle. A circuit board, or other suitable component, contains a plurality of electrical circuits and is secured within the housing. A first plurality of terminals defines a four way connector and a second plurality of terminals defines a seven way connector. Each of the first and second pluralities of terminals communicates with a selected number of said plurality of circuits and further define first and second input plugs accessible through the housing by the towed vehicle input harness. An electrical supply of the towing vehicle is engaged, via a wire harness or input connector, through the housing and with the circuits and in order to electrically communicating the towing vehicle's electrical supply.

20 Claims, 5 Drawing Sheets

COMBINED FOUR WAY AND SEVEN WAY CONNECTOR ASSEMBLY FOR USE WITH A VEHICLE AND FOR ACCOMMODATING A TRAILER TOW PACKAGE

BACKGROUND OF THE INVENTION

1. Field of the Invention

The present invention relates generally to four and seven way connector assemblies for communicating a vehicle's electrical system with corresponding four or seven way input connectors extending from conventional trailer tow packages. More particularly, the present invention is directed to a single unit assembly which combines both the seven and four way fret connectors, the combined assembly capable of being secured at an appropriate location, such as to the rear bumper of the vehicle.

2. Description of the Prior Art

The towing of work and recreational trailers and campers, behind a vehicle, is well known in the art. For reasons of safety and convenience, it is necessary to communicate the towing vehicle's electrical supply system to electrically operable accessories located on the wheeled trailer or camper being towed. The number of such accessories typically range from the rear lights of a trailer, usually requiring up to four metal fret connectors, to up to several electrical accessories, including again rear lights and additional refrigeration, heating, and/or power supply requirements typical of tow-behind campers.

The existence of four way and seven way fret connectors, these being the power supply terminals to which the power input cords of the trailer or RV plugs into, are by themselves known in the art. The prior art contemplates the 7 way and 4 way connectors being separately connected to the vehicle's electrical system and extending, in substantially freely hanging fashion, from the vehicle's rear bumper. The prior art also includes the provision of a separately engageable adapter and which, depending upon which input side is engaged, adapts an output side to either a 4 way or 7 seven way connector. Additionally, power switching functions for various trailer/RV options are further accomplished through components packaged inside the vehicle or under the hood. Among the disadvantages attendant with having separate 4 and 7 way connectors at the rear of the vehicle is the requirement that the both such connectors must always be made available in the event a customer requests a trailer tow option on the vehicle.

Additional examples of prior art connectors including the unified connector interface, U.S. Pat. No. 5,443,389 issued to Hughes. The connector interface mounts on a towing vehicle and is adapted to provide electrical connection with any one of a plurality of towed vehicle wiring harness electrical connectors. The unified connector interface is adapted to receive a selected round connector having a plurality of connectors extending from the towed vehicle wiring harness. The unified connector interface is also adapted to provide an interface between complimentary connectors and with piggyback double electrical connectors, as well as with individual or two wire connectors. The housing of the device is further sized to receive a circuit board therein, which aligns the connectors on the first side with the connectors on the second side.

U.S. Pat. No. 5,354,204, issued to Hughes, teaches a wiring harness adapter and method for fabricating in which the adapting has particular application for mating a four-way flat harness connector of a trailer at one end and a complex round harness connector with numerous terminals at an opposite end. U.S. Pat. No. 5,514,009, also issued to Hughes, teaches another variation of a wire harness adaptor and method for connecting the vehicle electrical system to the tow vehicle and in particular to a 4 way flat harness connector.

Finally, U.S. Pat. No. 5,765,848, issued to Silvey, discloses a trailer accessory for protectably receiving trailer plugs and in which a boot having one or more plug receptacles is connected to the tongue of a trailer as well as for holding the trailer chains. The boot is constructed of a pliable thermoplastic rubber elastomer with form fitted plug receptacles for receiving the trailer plugs, for such as lighting and braking the trailer. A base of the unit includes a central aperture for creating an interference fit with the boot and outboard slots for receiving the ends of trailer chains and the base is further connected to the tongue of the trailer by threaded fasteners.

SUMMARY OF THE PRESENT INVENTION

The present invention discloses an integral housing combining both seven way and four way fret connectors into a single unit, the combined assembly capable of being secured at an appropriate location, such as to the rear bumper of the vehicle, and of providing effective communication of a towing vehicle's electrical supply to an input harness associated with a tow behind vehicle, such as again may include a trailer, recreational vehicle or the like. The present invention is further an improvement over the prior art in that it does away with the need for separate 7 and 4 way connectors, as well as the use of adapters, in favor of a single housing construction displaying both the 4 and 4 way connector inputs in proximate and engageable fashion. The present invention further enables the use of light gauge signal wires extending from the vehicle to the unit housing and provides high current switching content from congested areas of the vehicle electrical system to areas without congestion.

The housing for the connector assembly may be provided as a single piece or, alternatively, as first and second assembleable portions. The housing includes a top and a plurality, typically four, interconnected sides which defines a three dimensional module.

A plurality of circuits are contained within the housing and are incorporated, in one variant, into a circuit board which communicates with pluralities of four and seven terminals which define, respectively, the four and seven way connectors. Typically, a total of seven circuits are provided, for accommodating the requirements of the 7 way connector, and a subset four of these circuits are shared with the 4 way connector.

Additional pluralities of electrical components, including fuses, mechanical relays and the like, are secured to the circuit board and provide circuit protection and power switching functions to the module. Alternatively, these components may be incorporated into the vehicles existing electrical system and the combined 4 and 7 way module limited to the basic circuit arrangement and terminal pluralities.

The terminals of the first variant include the provision of metal frets which are soldered by solder tails upon a selected face of the circuit board and interiorly configured receiving holes are further defined within the frets for facilitating the subsequent engagement by the towed input harness. An insulator layer is typically provided between the metal frets and the circuit board and acts as a spacer as well as to mechanically isolate the fret solder tails from the circuit board solder joints. Access covers corresponding to each of the 7 and 4 way connectors are defined upon the housing and are actuable to reveal the pluralities of terminals, or frets, corresponding to the individual connectors.

A further variant discloses the application of the printed circuit board for establishing all of the electrical connections between the terminals and without the provision of the metal frets. A potting material encapsulates the printed circuit and in order to relieve component mechanical strain.

A yet further variant discloses the circuit board substituted by an insert molded components integrating metal stampings and a plasticized insulator and which also provides the mechanical features for terminal strain relief and electrical conduction. A still further variation teaches the use of a flexible circuit integrating an electrically conductive foil and plastic insulating laminate and to which the components are soldered. A potting material again may be utilized to encapsulate the components associated with the flexible circuit and to provide mechanical strain relief.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
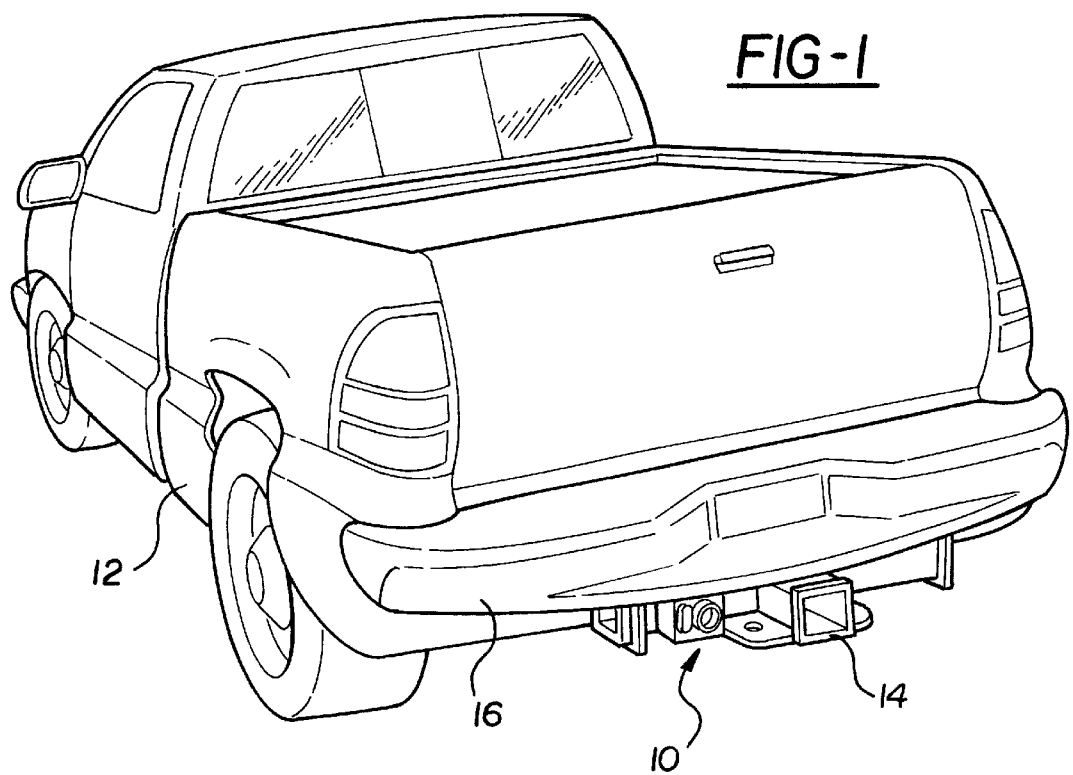
FIG. 1 is an environmental view of the combined 4 way and 7 way connector assembly mounted to the rear of a towing vehicle.

Referring now to FIG. 1, a combined four way and seven way connector assembly is illustrated at 10 for use with a towing vehicle 12 and for communicating the vehicle's existing electrical supply system to selected electrically operable devices associated with a tow-behind vehicle, such as typically including a trailer, recreational vehicle or the like. As previously described, the number of accessories associated with such tow behind vehicles (not shown) typically range from rear lights of a trailer (or RV), usually requiring up to four connectors. Additional electrical accessories, including again rear lights and additional refrigeration, heating, and/or power supply requirements (adding up to several accessories) are typical of tow-behind campers and to which the 7 way connector is applicable. Further, and in a preferred application, the connector assembly 10 is secured to a location at the rear of the vehicle, such as in proximity to a trailer hitch 14 and beneath a rear bumper 16 of the vehicle 12.

Figure 2B:
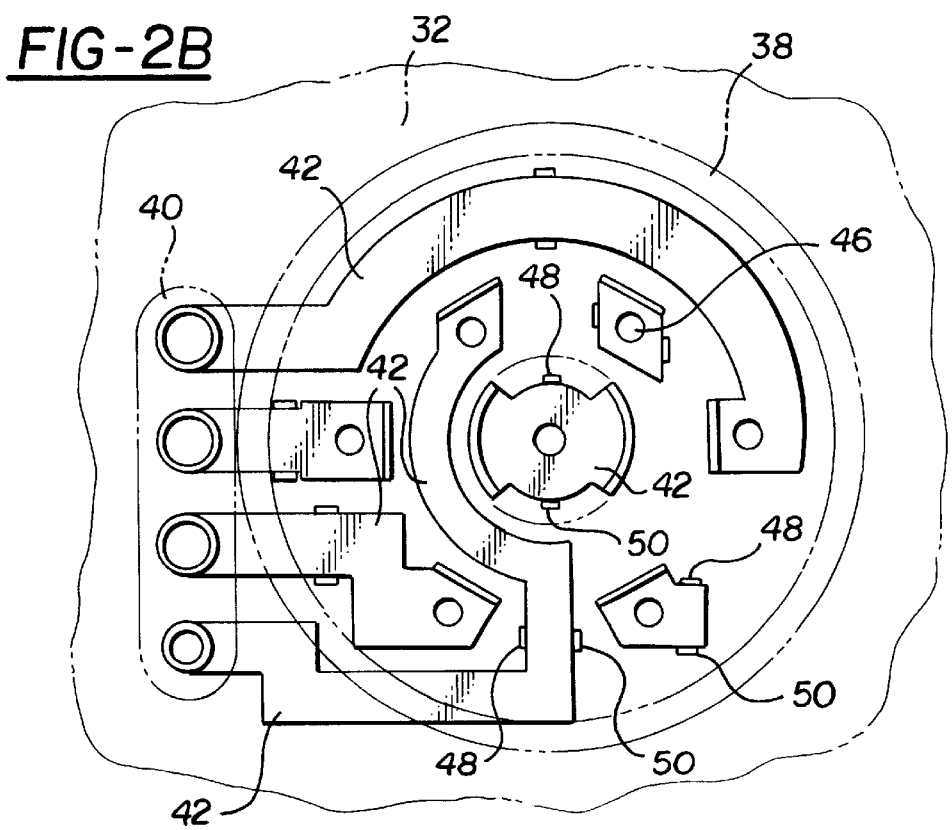
FIG. 2b is an enlarged view, taken along section line 2B of FIG. 2, and illustrating the metal frets for the combined 4 way and 7 way connectors, as well as solder tails which mate and are soldered to the printed circuit board underlying the frets.
Figure 2:
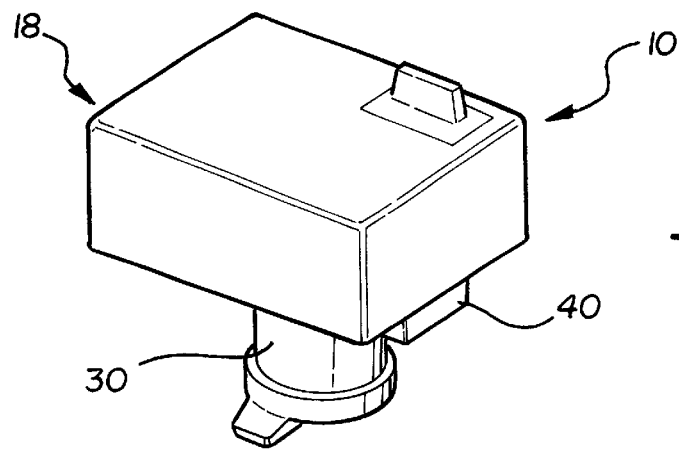
FIG. 2 is an assembled and rotated view, in perspective, of the connector assembly also shown in FIG. 1.
Figure 2A:
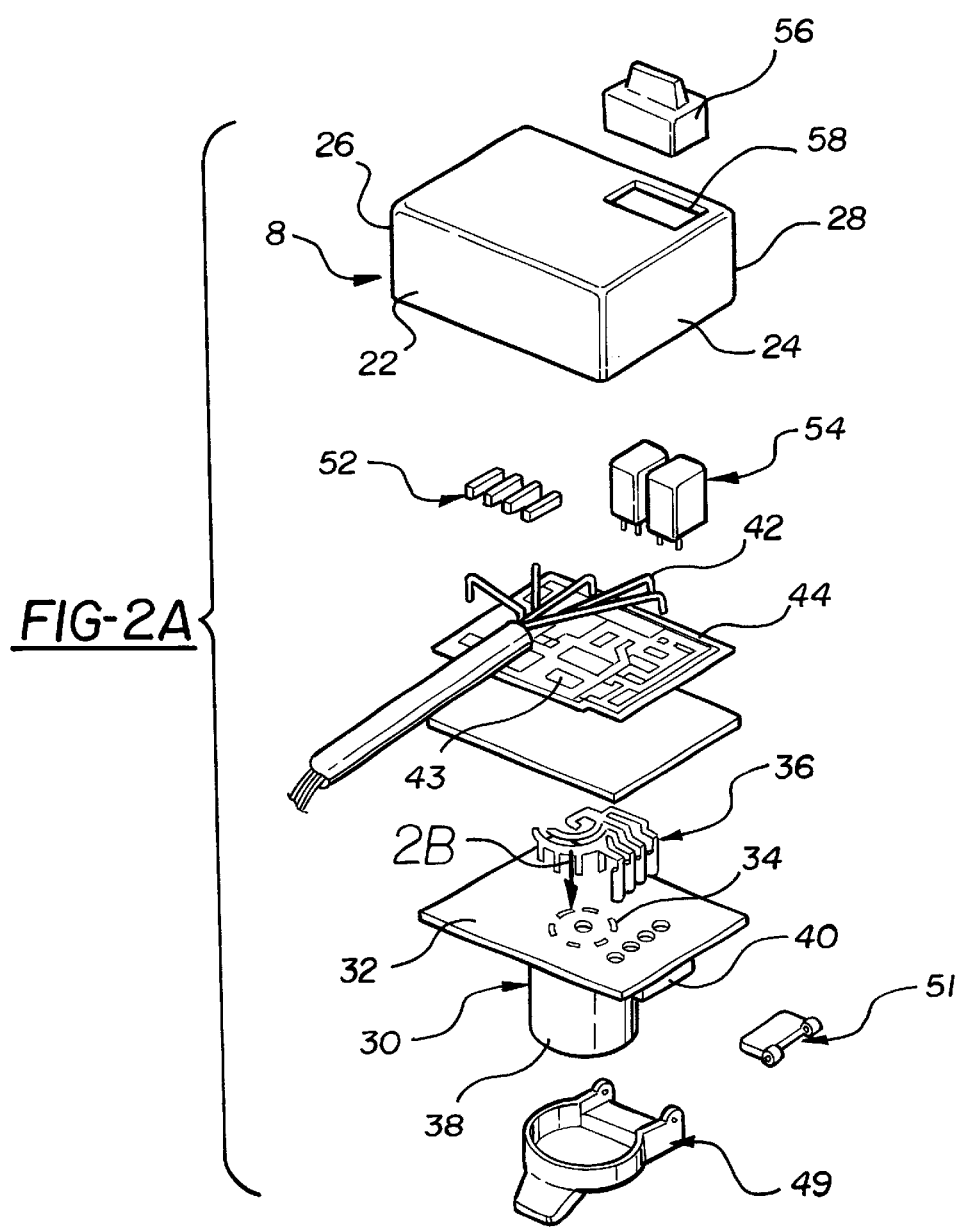
FIG. 2a is an exploded view of a connector assembly according to FIG. 2 and illustrating the stamped frets, insulator, assembleable housing portions and 4 and 7 way access covers along with the provision of integral input connector engageable with the connector assembly housing and for communicating the towing vehicle's electrical supply.

Referring now to FIG. 2, as well as to FIGS. 2A and 2B, the connector assembly 10 is again shown, a housing for which includes a first body portion 18 having a top 20 and first 22, second 24, third 26 and fourth 28 interconnected and extending sides which defines an interiorly hollowed (not shown) interior. A second assembly portion 30 of the housing is also provided as a three-dimensional article and includes a substantially flattened and planar shaped portion 32 which is matingly engageable around the interconnected perimeter defined by the sides 22–28 of the first body portion 18. The planar shaped portion 32 has defined, through its surface, an interior aperture array 34 for mating reception of a plurality of terminals 36 and which combines the 4 way and 7 way connectors into one insert. In order to accommodate the insertion of the terminal array 36, the configuration of the second assembly portion 30 is deepened at 38 and 40 to seatingly receive the 7 way and 4 way portions of the array 36, respectively and through the aperture array 34 and so that, referring again to FIG. 2B, respective 4 way and 7 way receiving sockets are defined for receiving an associated input harness of the vehicle being towed.

According to the preferred variant, a circuit board arrangement is defined by a plurality of stamped metal frets 42, arranged according to a desired layout, and which are placed upon a circuit board surface defined also by an insulating layer 44 interposing between the frets and circuit board. A plurality of apertures 43 are defined through the insulating layer 44, at selected locations, and electrically communicate the stamped frets 42 with the 4 and 7 way pins associated with the array 36.

Referring further to the enlarged section view of FIG. 2B, segmented portions of the fret array 42 are again illustrated and each of which terminates in interiorly configured receiving holes 46 (typically formed through the fret and underlaying circuit board and insulating layer) associated with both the first and second plurality components of the combined terminal array 36 and for receiving plastic posts (not shown) for relieving strain and for locating and communicating with the 4 and 7 way terminal array 36. Also associated with each of the frets are individual pairs of extending solder tails (see at 48 and 50 by example in FIG. 2B) and which is soldered to the circuit board solder joints (while at the same time being mechanically insulated by surface insulating layer 44) to secure the frets in aligning fashion with the various terminals 36. Access covers 49 and 51 are also indicated, are secured to exposed end faces of the deepened portions 38 and 40 of the second assembly portion 30, and are actuable, respectively, to reveal the inputs associated with the 7 way and the 4 way connectors.

Referring again to FIG. 2A, additional features of the variant 10 include the provision of fuses 52 and mechanical relays 54 which provide such features as circuit protection and power switching functions to the connector assembly. It is further understood that the necessary components identified at 52 and 54 can be removed from the connector assembly 10 within the scope of the present invention and that these functions may also be provided as a component of the towing vehicle's 12 existing electrical support and supply.

An input connector 56 is integrally formed with the housing and typically is positioned over the area on the top surface 20 of the first body component 18 and which is defined by the phantom area illustration 58. The input connector 56 communicates the towing vehicle's electrical supply to the circuits contained in the fret 42 and insulated circuit board 44 and consequently to the terminals 36 forming the 7 and 4 way connectors.

Figure 3:
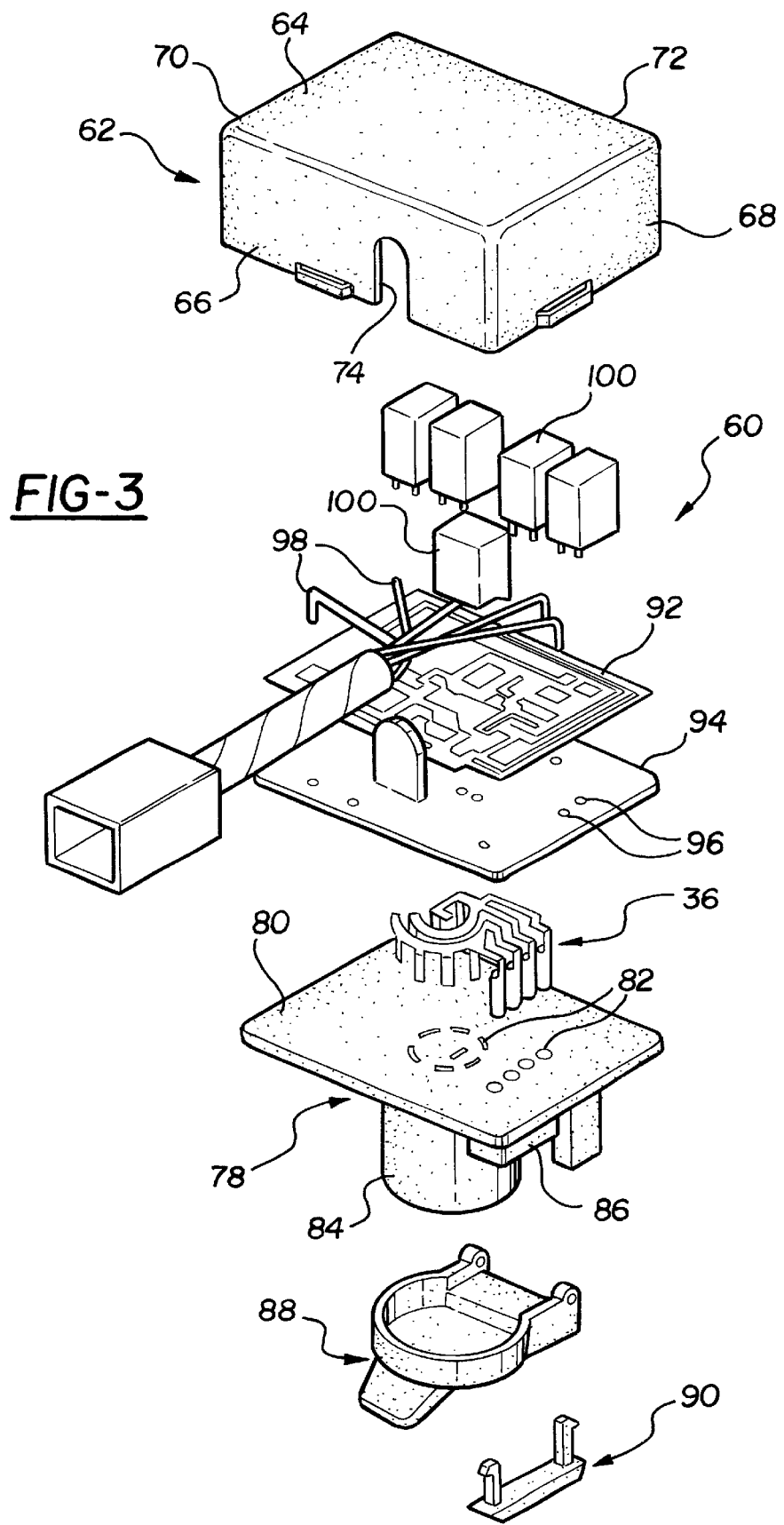
FIG. 3 is an exploded view of a first alternate embodiment of the combined 4 and 7 way fret connector assembly of the present invention and which includes an insert molded component integrating the metal stampings and a plastic insulator.

Referring now to FIG. 3, an exploded assembly is illustrated at 60 of the combined 4 and 7 way connector assembly according to a further preferred variant and which includes a number of features consistent with the description of FIG. 2A, among those including a housing for which includes a first body portion 62 having a top 64 and first 66, second 68, third 70 and fourth 72 interconnected and extending sides which defines an interiorly hollowed (not shown) interior. A channeled recess 74 is defined in a selected side of the first body portion 62, such as first side 66 illustrated, and for purposes of receiving an input conduit 76 forming a portion of the electrical supply output of the towing vehicle.

A second assembly portion 78 of the housing is also provided as a three-dimensional article, substantially identical to that previously illustrated at 30 in FIG. 2A, and again includes a substantially flattened and planar shaped portion 80 which is matingly engageable around the interconnected perimeter defined by the sides 66–70 of the first body portion 62. As in the first variant, the planar shaped portion 80 has defined, through its surface, an interior aperture array 82 (defining apertures for both the 4 and 7 way terminal pins) for mating reception of the plurality of terminals, again illustrated at 36, and which combines the 4 way and 7 way connectors into one insert.

In order to accommodate the insertion of the terminal array 36, the configuration of the second assembly portion 78 is deepened at 84 and 86 to seatingly receive the 7 way and 4 way portions of the array 36, respectively and through the aperture array 34 and so that respective 4 way and 7 way receiving sockets are defined for receiving an associated input harness of the vehicle being towed. Access covers are again defined at 88 and 90 for covering, respectively the exposed end faces associated with the deepened body portions 84 and 86 and are actuable to reveal the terminals, associated with the insert array 36, and which correspond to the 7 way and 4 way components.

According to the further preferred variant of FIG. 3, the circuit board arrangement is defined by an insert molded component 92 integrating metal stampings and a plasticized insulator and which replaces the plurality of stamped metal frets previously illustrated at 42 in the initial preferred embodiment of FIG. 2A. The insert molded component 92 is arranged according to a desired layout, and is placed upon an insulator 94 defining a mechanical barrier between the insert molded component 92 and the terminal array 36. A plurality of apertures 96 are defined through the insulating layer 94, at selected locations similarly as is defined by the apertures 43 in the insulating layer 44 in the first preferred variant, and communicate the circuits defined in the insert molded component 92 to specific terminals in the array 36 and which are associated with the 4 and 7 way connectors.

Additional features of the variant 60 of the combined 4 and 7 way connector assembly include individual lead wires 98 extending from the input conduit 78 and which in combination define a short wire harness which replaces the integrally formed input connector 56 in the first variant. The wires 98 communicate with selected locations upon the insert molded component 92 and thereby supply the electrical input of the towing vehicle.

Additional circuit and/or switching capacity may be provided to the connector assembly 60, illustrated such as by relays (five of which are shown) are illustrated collectively at 100 and which provide electromechanical or electrical power switching to the assembly. Alternatively, and as has been previously described, the present invention may function solely with the electrical circuits (embodied in some fashion), the terminal pin array 36 and a housing (having one or more pieces), the features of the switching and circuit protection being incorporated (if desired) directly into the existing electrical architecture of the towing vehicle.

Figure 4:
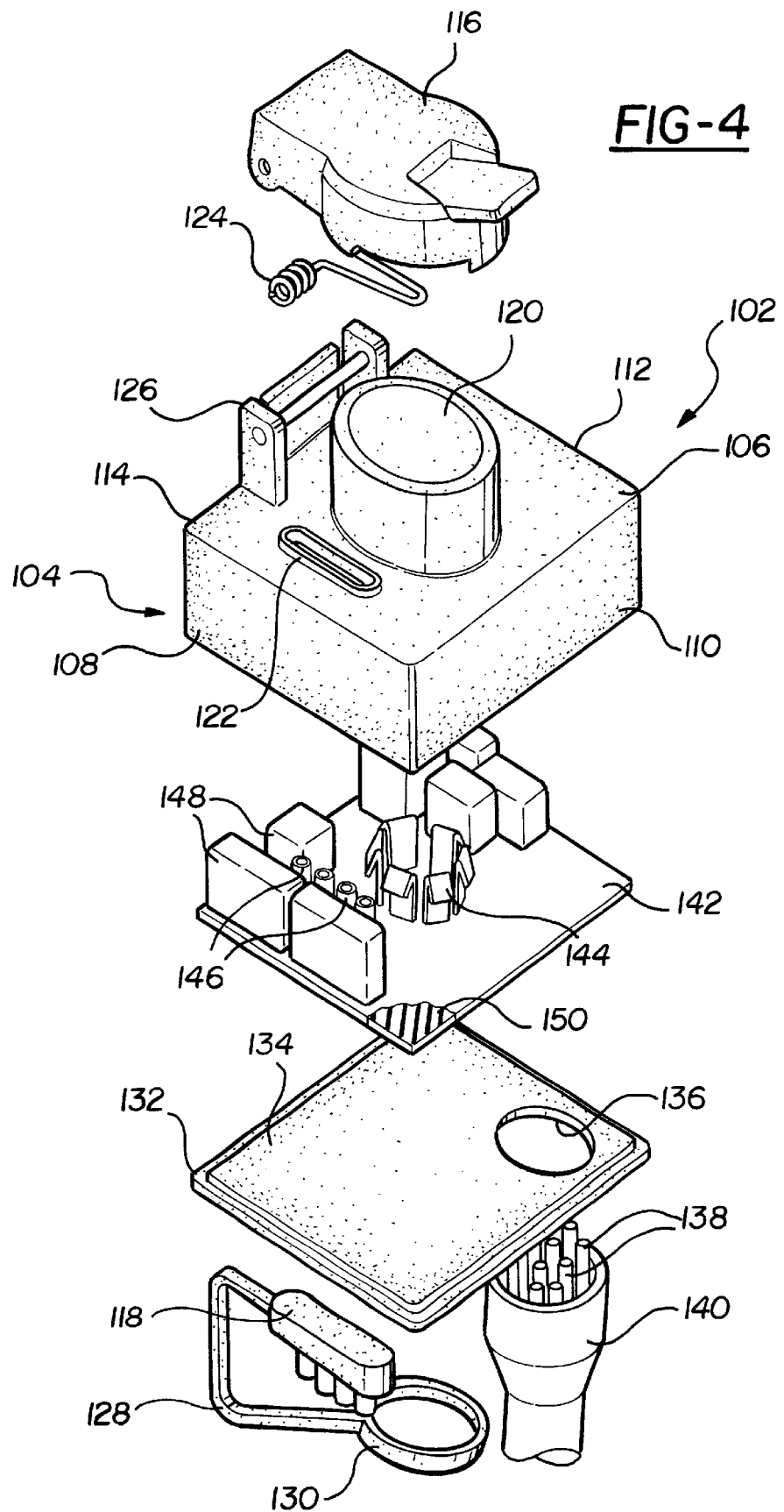
FIG. 4 is an exploded view of a second alternate embodiment of the present invention and which includes a printed circuit board in substitution of the metal frets.

Referring now to FIG. 4, a further variant of the combined 4 and 7 way connector assembly is illustrated in exploded fashion at 102. A housing further includes a first body portion 104 having a top 106 and four interconnected sides 108, 110, 112 and 114. First 116 and second 118 access covers associate with specified locations 120 and 122 defined, respectively, upon the exterior and exposed top 106 of the body portion 104. The locations 120 and 122 again correspond to insert sockets associated with the 7 and 4 way connector terminals, as will be further described, and the access covers 120 and 122 are designed (the first access location 120 defining a projecting annular member and the second location 122 defining a recessed location) to be actuable to reveal the associated terminals.

The first access cover 116 is spring loaded at 124 and, upon being mounted to extending pedestal 126 associated with the top surface 106 of the body portion 104, spring loads the first cover 116 over the opening location 120. The second access cover 118 further includes an elongate and neck connecting portion 128 extending between the access cover 118 and a base ring 130, the ring 130 in turn affixing over the annular exterior surface defining the projecting location 120 associated with the 7 way terminal array and to fixedly engage the second access cover to the assembly.

A second and backing portion of the housing is illustrated at 132 and includes an insulated top surface 134. The backing portion 132 is substantially rectangular shaped, in the preferred variant, and so as to matingly engaging against the open facing end of the first body portion 104. An annular and inwardly facing wall 136 is defined in the second backing portion 132 and defines an aperture for receiving a plurality of input wires 138 associated with the vehicle electrical supply, again illustrated in the form of a short wire harness 140 extending from the towing vehicles electrical supply system.

The plurality of circuits in the further preferred variant 102 of the present invention is provided by a printed circuit board 142 (and which again substitutes the use of metal frets such as in the preferred variant). First 144 and second 146 pluralities of terminals (again corresponding to the 7 way and 4 way connector arrays, respectively) extend integrally from selected locations and from the selected and upper face of the printed circuit board 142. Extending ends of the input wires 138 engage at selected locations, not shown, preferably on the underside of the circuit board 142 and which associated with solder points of the first 144 and second 146 terminals of the 7 and 4 way connectors. Circuit protection and switching capabilities may again be provided by such conventional components, generally referenced at 146, and the printed circuit board and components (including terminals 144 and 146 and components 148) may also be encapsulated in a potting material, referenced generally at 150, to provide component mechanical strain relief.

Figure 5A:
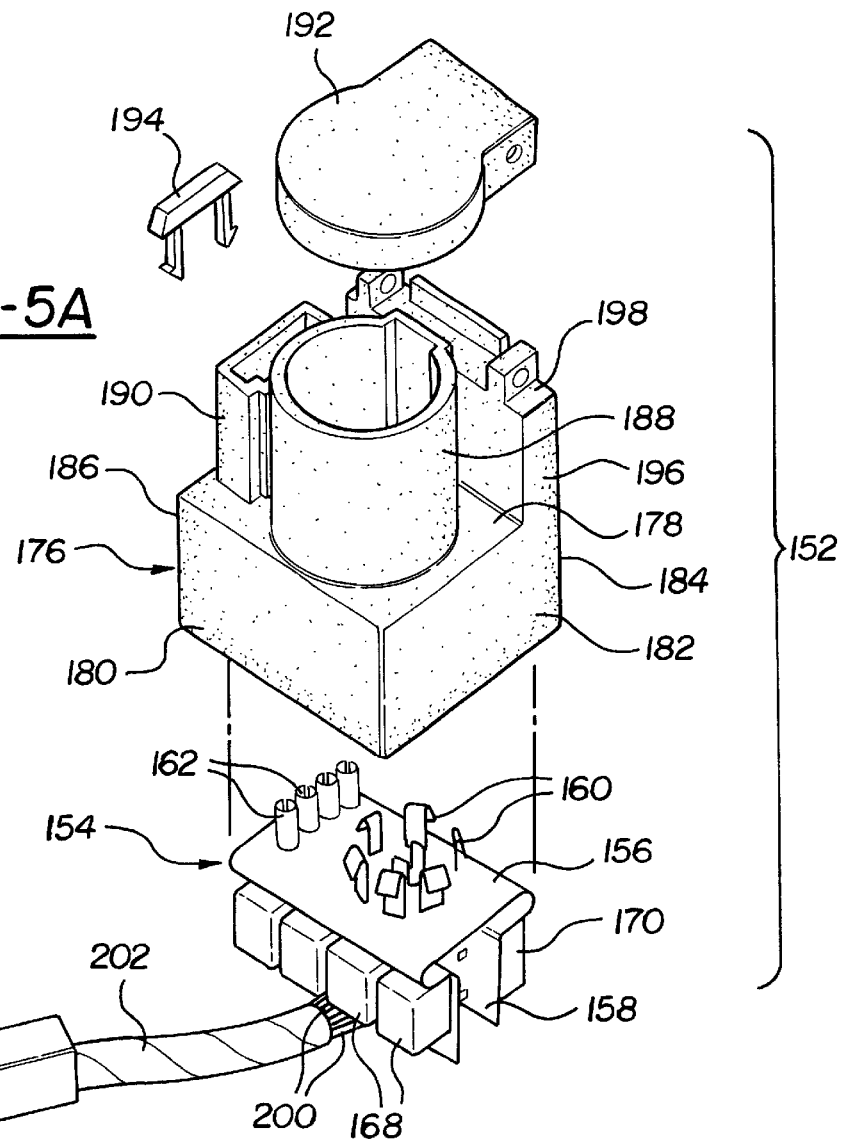
FIG. 5a is an exploded view of a third alternate embodiment of the present invention and which includes a flexible circuit integrating an electrically conductive foil and plastic insulator in substitution of the printed circuit board.

Referring finally to FIG. 5A, a combined 4 way and 7 way connector assembly is illustrated at 152 according to a yet further variation of the present invention and which includes the plurality of electrical circuits embodied in a flexible circuit 154. The flexible circuit 154 is, by itself, a known element and integrates the features of an electrically conductive foil and a plastic insulating laminate. The flexible circuit 154 further includes a first face 156 and a second opposite face 158.

Figure 5B:
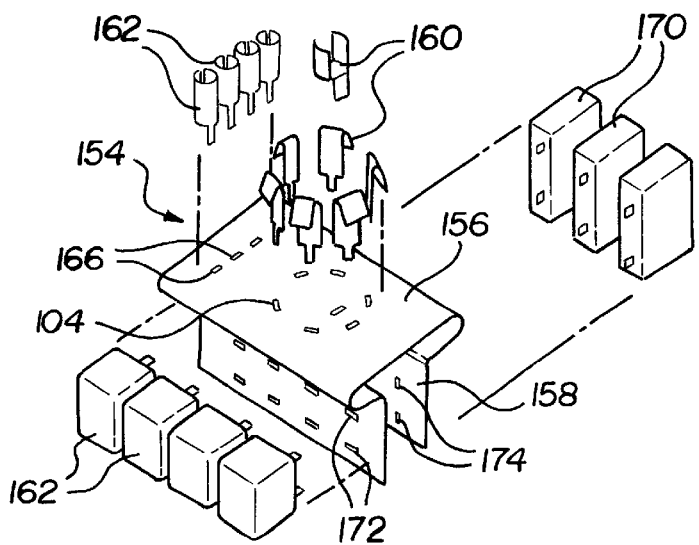
FIG. 5b is a further sectional view, in exploded fashion, of the flexible circuit illustrated in FIG. 5a and also showing the 4 and 7 way blades, circuit protection components and mechanical relays according to the third alternate embodiment.

As best illustrated in the exploded view of FIG. 5B, the circuit 154 is capable of being configured in a desired fashion and so that the first face 156 defines a first location to which are secured first 160 and second 162 pluralities of terminals associated with the 7 and 4 way connectors, respectively. Pluralities of apertures are defined in the flexible circuit 154, at 164 and 166, respectively, and for receiving in inserting fashion the 7 way terminals 160 and the 4 way terminals 162.

Additional circuit protection components and relays, illustrated generally by pluralities of components 168 and 170 are secured to additional and folded side locations of the flexible circuit 154 defined along the first face 156. Additional pluralities of apertures 172 and 174 may be formed through the flexible circuit 154, along the side folded locations corresponding to the placement of the plurality of components 168 and 170. The various pluralities of apertures 164, 166, 172 and 174 therefore provide the ability to solder, or attach in any other suitable fashion, the terminals 160 and 162, as well as components 168 and 170, to the flexible circuit 154. As with the earlier preferred variant of FIG. 4, component strain relief may again be provided by encapsulating the components in a potting material and such as has been previously illustrated at 150 (again in FIG. 4).

Referring again to FIG. 5A, a housing includes a body portion 176 having a top 178 and four 180, 182, 184 and 186 interconnected sides. The body portion 176 is again configured in three dimension to enclose the flexible circuit 154, with assembled terminals 160, 162 and ancillary components 168 and 170. Defined in the top 178 of the body portion 176 are first 188 and second 190 projections and which define internal receiving cavities for the associated 7 way terminals 160 and 4 way terminals 162. Although a second and covering body portion is not illustrated in FIG. 5A, it is understood that it advantageously may exist for enclosing the assembly. Alternatively, that the flexible circuit 154 can suitably be secured with the interior of the body portion 176 with or without the provision of an additional housing portion.

The first projection 188 is, similarly to the previously disclosed variants, an annular extending wall. The second projection 190 is likewise generally rectangular shaped and each projection 188 and 190 is configured to define an appropriate insertion socket aligning with the array of the selected plurality of terminals 160 and 162 and receiving the input plug associated with the existing wire supply harness (again not shown) of the towed vehicle.

First 192 and second 194 access covers again are associatingly engaged over the open ends corresponding to the first 188 and second 190 projections. A pedestal 196 (similar to that also illustrated at 126 in the variant of FIG. 4) can extend upwardly from the top 178 of the body portion 176 and to actually and pivotally engage, about an axis defined by 198 at the top of the pedestal 196, the access cover 192 for the 7 way connector.

A plurality of input wires 200, associated again with a vehicle electrical supply harness 202, engage selected locations along the second opposite face 158 of the flexible circuit 154, and communicate with the terminals 160 and 162 and ancillary components 168 and 170 via the apertures 164, 166, 172 and 174, respectively, defined through the flexible circuit 154.

As previously explained, the present invention is an improvement over the prior art in that it does away with the need for separate 7 and 4 way connectors, as well as the use of adapters, in favor of a single housing construction displaying both the 4 and 4 way connector inputs in proximate and engageable fashion. The present invention further enables the use of light gauge signal wires extending from the vehicle to the unit housing and provides high current switching content from congested areas of the vehicle electrical system to areas without congestion.

Having described our invention, additional preferred embodiments will become apparent to those skilled in the art to which it pertains and without deviating from the scope of the appended claims.

We claim:

1. A combined four way and seven way connector assembly for communicating a towing vehicle's electrical system with either a four way or seven way input harness associated with a towed vehicle, the towing vehicle further including a wire harness supplying an output of the electrical system, said connector assembly comprising:

a housing containing a plurality of electrical circuits which communicate with a first plurality of terminals defining a four way connector and a second plurality of terminals defining a seven way connector, each of said first and second pluralities of terminals defining an input plug in said housing and which is accessible by the towed vehicle input harness; and connecting means for electrically communicating the towing vehicle's electrical supply wire harness to said plurality of circuits.

2. The connector assembly as described in claim 1, said plurality of electrical circuits further comprising a printed circuit board.

3. The connector assembly as described in claim 2, said first plurality of terminals including a first plurality of metal frets and said second plurality of terminals including a second plurality of metal frets, an insulating layer interposing between said frets and said circuit board and each of said frets further including interiorly configured receiving holes and extending solder tails which mate and are soldered to said circuit board.

4. The connector assembly as described in claim 1, said plurality of electrical circuits further comprising a common subplurality of four circuits associated with said four way connector, an additional plurality of three circuits combining with said subplurality of four circuits and associated with said seven way connector.

5. The connector assembly as described in claim 2, said circuit board further comprising a plurality of electrical components selected from the group including fuses and mechanical relays, said relays providing power switching functions to said connector assembly.

6. The connector assembly as described in claim 2, further comprising said first and second pluralities of terminals integrally being formed with and extending from a selected face of said printed circuit board.

7. The connector assembly as described in claim 2, further comprising said printed circuit board being encapsulated in a potting material.

8. The connector assembly as described in claim 6, said housing further comprising a first body portion having a top and four interconnected sides, at least one access cover associating with an exterior face of said body portion and being actuable to reveal said first and second pluralities of terminals, a second insulated and backing portion matingly assembling against and open rear of said first body portion and enclosing said circuit board therebetween.

9. The connector assembly as described in claim 8, said connecting means further comprising an annular and inwardly facing wall defined in said second backing portion and which defines an aperture for receiving a plurality of input wires associated with the vehicle electrical supply.

10. The connector assembly as described in claim 1, said plurality of electrical circuits further comprising an insert molded component integrating metal stampings and a plasticized insulator.

11. The connector assembly as described in claim 10, further comprising a plurality of electrical components selected from the group including fuses and mechanical relays and which are assembled upon said insert molded component.

12. The connector assembly as described in claim 10, said housing further comprising a first covering portion having a substantially planar top and four interconnected sides, a second assembly portion including interiorly configured apertures for receiving an insert component defining said first and second pluralities of terminals.

13. The connector assembly as described in claim 12, at least one access cover associating with a face of said second assembly portion opposite said first covering portion, said access cover being actuable to reveal said first and second pluralities of terminals, said second assembly portion securing said first and second pluralities of terminals.

14. The connector assembly as described in claim 13, said connecting means further comprising a plurality of input wires associated with said vehicle electrical supply harness extending through an aperture configured in a selected one of said four interconnecting sides of said first covering portion, extending ends of said input wires engaging selected locations of said insert molded component.

15. The connector assembly as described in claim 1, said plurality of electrical circuits further comprising a flexible circuit having a first face and a second opposite face and which integrates an electrically conductive foil and a plastic insulating laminate.

16. The connector assembly as described in claim 15, said flexible circuit being configured in a desired fashion and so that said first face defines a first location to which are secured said first and second pluralities of terminals, additional pluralities of circuit protection components and relays being secured to at least one additional location of said flexible circuit defined along said first face.

17. The connector assembly as described in claim 15, said housing further comprising a body portion having a top and four interconnected sides enclosing said flexible circuit, at least one access cover associating with an exterior face of said body portion and being actuable to reveal said first and second pluralities of terminals.

18. The connector assembly as described in claim 17, said connecting means further comprising a plurality of input wires associated with said vehicle electrical supply harness and which engage selected locations along said second opposite face of said flexible circuit.

19. A combined four way and seven way connector assembly for communicating a towing vehicle's electrical system with either a four way or seven way input harness associated with a towed vehicle, the towing vehicle further including a wire harness supplying an output of the electrical system, said connector assembly comprising:

a three dimensional housing including a top and a plurality of interconnected sides;

a circuit board supporting a plurality of electrical circuits and which is contained within said housing;

a first plurality of terminals defining a four way connector and a second plurality of terminals defining a seven way connector, each of said first and second pluralities of terminals including metal frets and which communicate with a selected number of said plurality of circuits, said first and second pluralities of terminals defining first and second input plugs accessible through said housing by the towed vehicle input harness; and an integral input connector accessible through said housing and with said circuit board, said input connector electrically communicating the towing vehicle's electrical supply wire harness to said plurality of circuits.

20. A combined four way and seven way connector assembly for communicating a towing vehicle's electrical system with either a four way or seven way input harness associated with a towed vehicle, the towing vehicle further including a wire harness supplying an output of the electrical system, said connector assembly comprising:

a three dimensional housing including a top and a plurality of interconnected sides;

a substantially planar shaped component supporting a plurality of electrical circuits and which is contained within said housing;

a first plurality of terminals defining a four way connector and a second plurality of terminals defining a seven way connector, each of said first and second pluralities of terminals communicating with a selected number of said plurality of circuits associated with said planar shaped component, said first and second pluralities of terminals defining first and second input plugs accessible through said housing by the towed vehicle input harness; and connecting means including a plurality of input wires associated with the vehicle electrical supply and which are accessible through said housing and with said circuits contained within said planar shaped component, said input wires electrically communicating the towing vehicle's electrical supply wire harness to said plurality of circuits.

* * * * *